W. A. DUFFIELD 2,882,750

TRANSMISSION

Filed Aug. 17, 1953

INVENTOR
William A. Duffield

BY
Bailey, Stephens + Huettig

ATTORNEY

April 21, 1959     W. A. DUFFIELD     2,882,750
TRANSMISSION Filed Aug. 17, 1953     7 Sheets-Sheet 5

INVENTOR
William A. Duffield
ATTORNEY

April 21, 1959 W. A. DUFFIELD 2,882,750
TRANSMISSION
Filed Aug. 17, 1953 7 Sheets-Sheet 7

INVENTOR
William A. Duffield
By
Bailey, Stephens + Huetty
ATTORNEY

2,882,750
TRANSMISSION

William A. Duffield, Mimico, Ontario, Canada

Application August 17, 1953, Serial No. 374,754

Claims priority, application Canada January 14, 1953

20 Claims. (Cl. 74—645)

This invention relates to a transmission and more particularly to a multi-stage variable speed transmission.

In general, the object of this invention is to provide a transmission with unusual adaptability of performance to the requirements of actual operation.

An object of this invention in its preferred embodiment is to provide a transmission including a hydraulic coupling of the fluid torque converter-fluid coupling type, and reduction gear units in which automatic control is exercised to conform the changes between various reduction ratio stages with the requirements of different operating conditions. It is also an object at the same time to preserve a measure of manual control of certain changes to enable the operator to deal with commonly occurring conditions under which conventional, purely automatic transmissions have proved to be unsatisfactory.

The preferred transmission contemplated by this invention takes advantage of the high torque character of fluid torque converters to start a heavy load from rest without shock and with a high degree of torque multiplication during the initial acceleration period, this multiplication being achieved by the cooperation of a fluid torque converter with several steps of reduction gearing. Thereafter the reduction gearing is relied upon for torque multiplication up to the final stage of direct drive with the former fluid torque converter acting as a fluid coupling. The load transmitted by the fluid coupling is progressively reduced as each step of reduction gearing is eliminated and finally when the transmission is in direct drive the fluid coupling is called upon to transmit a small proportion of the input power. A number of different reduction ratios are obtained by utilizing the reduction gear units singly and in more than one combination.

The points at which the various steps of reduction gearing are eliminated are controlled to correspond with the requirements of operating conditions. The clutching of one reduction gear reaction member to the input is controlled by a governor responsive to output speed. The speed at which this governor operates is varied in accordance with the degree of throttle so that the governor will act at a lower speed with a lighter throttle. The reaction member of the other reduction gear unit is clutched to the input by a centrifugal clutch; the conditions under which this centrifugal clutch can be engaged and under which it will disengage depend on speed and torque. High speed and low torque tend to promote its engagement. The actual engagement of the centrifugal clutch is achieved by a reversal of torque. The disengagement of this clutch occurs automatically under predetermined conditions, and the reaction member of the torque converter is utilized to insure its disengagement. Means controllable by the operator are provided to disengage the clutch joining the first mentioned reduction gear reaction member to the input independently of the governor to give torque multiplication under conditions which would call for the engagement of this clutch. In particular, this gives an optional manually operated change down from direct drive.

The construction and operation of a transmission in accordance with the preferred embodiment of this invention will be apparent from the description and from the drawings in which.

Figure 1:
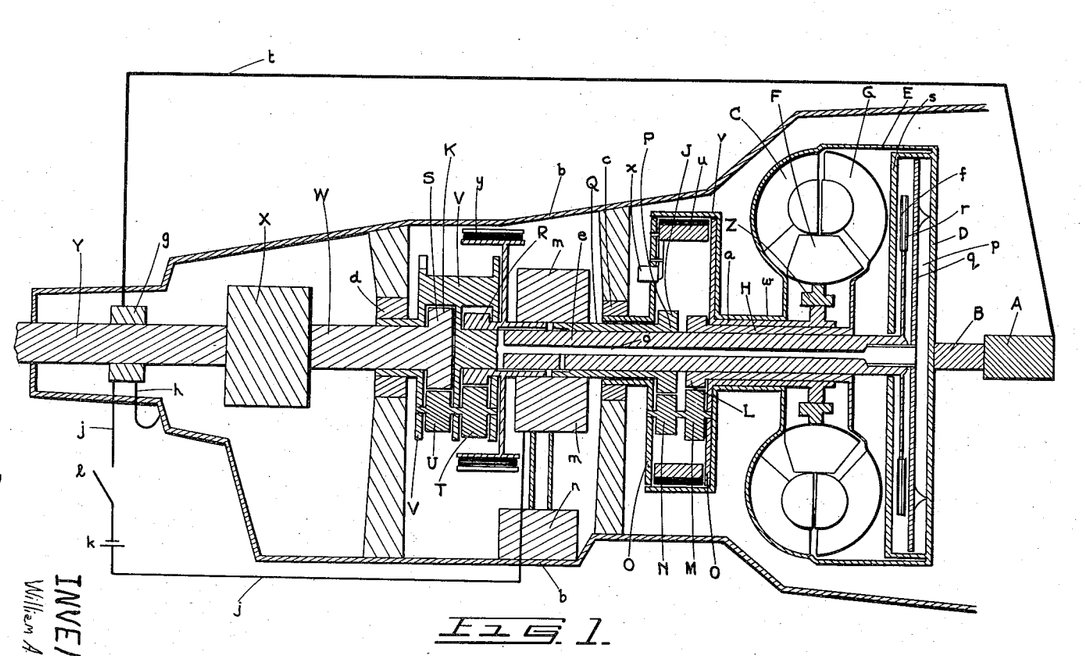
Figure 1 is a simplified diagrammatic side elevation sectional view of the transmission.

Before discussing the details of a transmission in accordance with the preferred embodiment of this invention, it is proposed to outline the main features of the structure and operation of the transmission with reference to the simplified drawing shown in Figure 1.

In Figure 1 a prime mover A drives an input shaft B which in turn drives impeller C through flywheel unit D and revolving casing E. During the initial starting stage, reaction member F of the hydraulic coupling will be stationary and there will be fluid torque conversion between impeller C and runner G. Runner G drives turbine shaft H. Further torque conversion is achieved by all spur-type planetary reduction gear units indicated generally by J and K.

The forward reduction gear unit includes an input sun gear L driven by shaft H, connected planetary gears M and N which are mounted in the gearing reaction member or gear carrier O, and output sun gear P. A drive shaft Q connects output sun gear P to the input sun gear R of the rear reduction gear unit. The rear reduction gear unit is similar to the forward unit and includes input sun gear R, output sun gear S and interconnected planetary gears T and U mounted in gear carrier V. The drive from output sun gear S passes through output shaft W, reverse gear unit X and output or tail shaft Y. The reverse gear unit is capable of making shafts W and Y rotate in the same direction or in opposite directions.

During the initial starting stages each of the torque conversion units will be in full operation. Thus there will be torque conversion in the hydraulic coupling and in both forward and rear reduction gear units. A suitable gear reduction ratio at this first stage is 4.33 to 1. With increased speed and decreased torque there will be a continuous decrease in the torque multiplication, in the hydraulic coupling unit, until the second stage is reached at which fluid torque conversion ceases, the unit becomes a fluid coupling, and the reaction member F commences to run forward with the runner G. An over-running clutch Z permits reaction member F to run forward but transmits its reaction during fluid torque conversion to the forward gear reaction member O through stub shaft $a$. The reaction of reaction member F and of the forward gear carrier O are transmitted to the static outer casing B of the transmission through one way brake $c$. Similarly the reaction of the rear gear carrier is transferred to the static frame through one way brake $d$. At this second stage of operation a suitable torque multiplication ratio is 2.06 to 1.

For the normal third stage of operation in changing up, the rear gear carrier V is clutched to the input of the transmission. Center shaft $e$ is connected and rotates at all times with rear gear carrier V. The engagement of hydraulically operated clutch $f$ effects a direct driving connection with the input shaft B. During this third stage of operation, the rear gear carrier V will be directly driven by the input shaft, but the drive to the input sun gear R of the rear gear carrier will still pass through reduction gear unit J and the fluid coupling. The speed of rotation of input sun gear R will therefore be proportionately less than the speed of rotation of gear carrier V due to the gear ratio of forward reduction gear unit and the slip in the fluid coupling. The output speed of shaft W will thus be the resultant of the speeds of gear carrier V and input sun gear R. At this third stage the reduction ratio of the transmission will be 1.42 to 1. The gear carrier V which is the reaction member during the first and second stages of operation will act as an input member during this third stage of operation and sun gear R which is the input member during the first and second stages of operation will take the reaction of the input to gear carrier V during the third stage. This reaction will be transmitted through shaft Q, sun gear P, planetary gears N, carrier O, and one way brake $c$ to the transmission casing. In the arrangement described sun gear R, although acting as the reaction member of the gearing during the third stage, will be rotating forwardly. It is contemplated that with a modification to the construction shown, sun gear R could be stationary instead of rotating forwardly during this intermediate stage. Thus, for example, sun gear R would be stationary if means were provided to disconnect the input from impeller C during the intermediate reduction stage.

Control of the engagement and disengagement of clutch F is by means of a governor $g$ which is responsive to the speed of output shaft Y. Governor $g$ completes an electrical circuit including, as one branch, line $h$ grounded on the static frame of the transmission and as the other branch line $j$ included within which is battery $k$ and switch 1. Line $j$ controls a fluid pump assembly $m$ which pumps fluid from reservoir $n$ through passage $o$ in the centre shaft into piston chamber $p$. Piston $q$ is forced rearwardly and clutch disc $r$ is gripped between piston $q$ and pressure plate $s$ to result in engagement of clutch $f$.

The speed at which governor $g$ operates is varied through a mechanical or other suitable linkage $t$ so that it depends on the degree of throttling of the prime mover A. At light throttle the governor calls for a shift up or down at a predetermined output shaft speed. At full throttle the shift occurs at $q$ speed higher than the predetermined speed for light throttle. This has the advantage of conforming the point at which the third stage comes into effect with the requirements of actual operation. If an increased throttle is being used it is extremely useful to delay the stage at which the transmission changes up to a lower ratio to reduce the torque requirements from the prime mover.

The fourth stage, of direct drive, is achieved when both gear carriers O and V are clutched to the input. The hydraulically operated clutch which links rear gear carrier V to the input has already been described. Gear carrier O is engaged by centrifugal clutch $u$ acting on clutch drum $v$. Clutch drum $v$ is connected with the impeller C through stub shaft $w$. The drive to gear carrier O when its clutch $u$ is engaged is therefore from input shaft B, through flywheel assembly D, rotating casing E, the casing of impeller C, stub shaft $w$, clutch drum $v$ to centrifugal clutch $u$. Clutch $w$ includes pivoting clutch shoes which tend to swing outwardly into engagement with the clutch drum $v$ under the influence of centrifugal force. This outward movement is opposed by compression springs in synchronizing ring $w$. The synchronizing ring is connected to the clutch shoes by links so that the outward pivoting of the clutch shoes will be controlled by the position of the synchronizing ring with respect to gear carrier O. The compression springs are positioned between portions of gear carrier O and ring $w$ so that they will tend to cause relative movement between ring $w$ and gear carrier O in a direction which will cause withdrawal of the clutch shoes.

The engagement of clutch $u$ is initiated by forward rotation of gear carrier O, since backward rotation of this gear carrier is prevented by one way brake $c$. Forward rotation of gear carrier O will occur in changing up if, with clutch $f$ engaged, there is a momentary reversal of torque in the transmission. That is to say, when the vehicle in which the transmission is mounted momentarily attempts to drive the engine forward. This condition will occur, due to the inertia of the vehicle, if there is a momentary deceleration by the operator. It will also occur on a down grade where the engine is being used for braking.

Once the clutch shoes of clutch $u$ are engaged with clutch drum $v$ there will be a condition of split torque. Part of the torque will take a mechanical path to the output sun gear P of the forward reduction gear unit from input B through impeller C, stub shaft $w$, clutch drum $v$ to gear carrier O and to sun gear P. The remainder of the torque will pass through the fluid coupling, shaft H and input sun gear L. Similarly part of the torque to output sun gear S of the rear gear carrier will pass by a direct mechanical path from input B through clutch $f$, shaft $e$, and gear carrier V. The remainder of the torque will pass from sun gear P, which receives its torque partly by a mechanical path and partly through the fluid coupling as explained above, along shaft Q to input sun gear R. It will be noted that most of the torque will travel by a mechanical path during direct drive. If, for the purpose of example, it is assumed that half of the torque to the output sun gear of each reduction gear unit passes through the gear carrier and half passes through the input sun gear, only a quarter of the torque transmitted to output sun gear S will pass through the fluid coupling. The effect of the slip in the fluid coupling during direct drive is therefore diminished without eliminating the resilience achieved by having part of the porque pass through the fluid coupling, as compared with a completely mechanical connection between input and output.

It will be noted that on changing up clutch $u$ will not be engaged prior to the engagement of clutch $f$, in the absence of a brake drum acting on the synchronizing ring as described in applicant's copending United States application 168,536, now Patent No. 2,679,169. If there is a reversal of torque in the transmission prior to the engagement of clutch $f$ it will reach the rear reduction unit first and will be dissipated by forward rotation of gear carrier V. Also, even if clutch $f$ is engaged, the clutch shoes of clutch $u$ will immediately disengage if predetermined conditions of speed and torque have not been reached. The maintenance of engagement and the disengagement of the clutch shoes with the clutch drum will depend on the following factors:

Centrifugal force will tend to bias the shoes outwardly. The compression springs in the synchronizing ring will tend to bias the shoes inwardly. These springs are light springs which exert just sufficient force to retract the shoes. If the centrifugal force is sufficient to overcome the compression springs, there will be frictional engagement between the clutch shoes and the brake drum. The amount of this frictional force tending to prevent slip will depend on the extent to which the outward biasing moment due to centrifugal force exceeds the inward biasing moment due to the compression springs of the synchronizing ring. The force tending to induce slip between the clutch shoes and the clutch drum will be the reaction of gear carrier O. Once this exceeds the frictional resistance, slip will occur, the clutch shoes will immediately pivot inwardly and the tendency of the gear carrier to rotate backwards will halt the forward rotation of the carrier. Since the reaction of gear carrier O depends upon the torque, slip will occur at a predetermined speed with low torque and at a lower speed than this predetermined speed at a higher torque. Accordingly, whether or not clutch u remains in engagement after being engaged by a reversal of torque will depend on predetermined conditions of speed and torque.

The conditions under which the clutch shoes will engage and disengage can be determined by the pre-set position of the pivot pins of the clutch shoes. Flattened pins oriented with the planes of the flattened surfaces extending radially with respect to the centre shaft of the transmission are used as pivot pins. A pair of segmental bushings are placed, one on each side of the flattened pin. The narrow edges of the pin extend short of the edges of the holes in the clutch pin to allow slight radial play of the pivot point of the clutch shoes. It will be appreciated that if, assuming a clockwise application of torque to the clutch drum, the pivot pins are turned clockwise from a radial orientation, there will be a component of the torque tending to urge the shoes outwtardly, whereas if the pins are turned anti-clockwise the torque component will tend to disengage the shoes at an earlier stage.

Another element tending to induce disengagement of the centrifugal clutch under certain conditions will be the reaction of reaction member F of the hydraulic coupling when torque conversion commences on changing down. If clutch u has not previously disengaged, the reaction of reaction member F which is transferred to gear carrier O by shaft a will augment the reaction of gear carrier O to induce slip and consequent disengagement.

The sequence of stages on changing down from direct drive will depend on operating conditions. If the vehicle is operating under light throttle governor g will call for a shift down at a low speed. Therefore the first change will be the disengagement of clutch u. Clutch f will remain engaged, and the stage attained will be the same as the third stage on changing up. The input sun gear of the rear gear set will rotate more slowly than the rear gear set carrier, due to the operation of the front gear set. There will, therefore, be torque conversion due to this combined operation of the gear sets. Subsequently governor g will act to place the rear gear set in operation. Both gear sets will be in full operation and the transmission will be at its second stage. Subsequently there will be continuously variable torque conversion as fluid torque conversion is initiated.

The sequence of stages on changing down will be different under conditions of full throttle on a heavy grade. Governor g will operate at a relatively high speed, and this will occur prior to the disengagement of clutch u. A fifth stage will therefore be reached in which the rear gear carrier V is released and torque conversion occurs only in the rear reduction gear unit. The ratio at this stage will be 1.29 to 1. Subsequently the front gear carrier O will become disengaged, both gear reduction units will be in operation and the transmission will be at its second stage. As explained above, centrifugal clutch u will disengage at a higher speed with a high torque than with a low torque. Therefore the change down to second speed will be at a higher speed when the vehicle is at near full throttle on a heavy grade than when the vehicle is operating on a light throttle and on a low grade. After the second stage on changing down there will be additional fluid torque conversion to the first stage.

Provision is made for the operator to change down from direct drive to fifth stage at will even when the conditions call for operation in direct drive. This provision comprises a manually operable switch 1 which is in series with the governor g. Opening of switch 1 will disengage clutch f independently of the governor to give torque conversion in the rear gear set only at a ratio of 1.29 to 1. Switch 1 can also be used to change from third stage to second stage. This manual control enables the operator to deal with unusual conditions such as, for example, will sometimes occur in winter driving.

The stages of operation in changing up and changing down may be summarized for convenience as follows:

CHANGING UP

*First stage.*—Fluid torque conversion with both front and rear gear reduction units operating. This is continuously variable. Initial ratio—4.33 to 1.

*Second stage.*—Fuid coupling with both gear reduction units operating. Ratio—2.06 to 1.

*Third stage.*—Rear gear set carrier clutched to input by the governor. Input sun gear of rear gear set rotates more slowly than the rear gear set carrier due to the operation of the front gear set. There will, therefore, be torque conversion due to this combined operation of the gear sets. Ratio—1.42 to 1.

*Fourth stage.*—Both front and rear gear set carriers clutched to input for direct drive. Forward rotation of the front gear set caused by a reversal of torque actuates forward centrifugal clutch. Clutch is returned in engagement as the centrifugal elements will now be rotated by the input. Ratio—1 to 1 less slip.

CHANGING DOWN FROM DIRECT DRIVE (a) *Optional manually controlled fifth stage for special conditions*

Switch in series with governor enables rear gear set carrier to be declutched independently of the governor to give torque conversion in rear gear set only. Ratio—1.29 to 1.

(b) *Automatic change down from direct drive under normal conditions of light or medium throttle*

*Third stage.*—When reaction of front gear carrier overcomes the grip between clutch shoes and clutch drum due to centrifugal force. This is assisted by reaction of the reaction member of the torque converter if not previously disengaged. Ratio—1.42 to 1.

*Second stage.*—Initiated by action of governor. Ratio—2.06 to 1.

*First stage.*—Final ratio—4.33 to 1.

(c) *Automatic change down from direct drive under conditions of full or nearly full throttle*

*Fifth stage.*—Actuated by governor with rear gear set only operating. Ratio—1.29 to 1.

*Second stage.*—When centrifugal clutch disengages. Ratio—2.06 to 1.

*First stage.*—Final ratio—4.33 to 1.

It will be appreciated that the reduction ratios given in the foregoing summaries are merely by way of example, and other suitable ratios may be selected.

It is contemplated that the reverse gear unit be driven by the output of the rear gear unit. The reverse gear unit is identified by the letter X in Figure 1. A hand brake y is provided to check the rotation of input sun gear R to ease the engagement of the gears of the reverse gear unit. Since the reduction units and clutches of the transmission will function in the same manner whether reverse gear unit X is adjusted to give shafts W and Y rotating in the same or opposite directions and as governor g will operate irrespective of the direction of rotation of shaft Y, the same stages of operation are available in reverse as the stages of operation outlined above for forward motion.

It will be apparent that modifications and variations may be made in the transmission described in this specification, within the scope of the appended claims, without departing from the essential concepts of this invention. For example, the all spur type planetary reduction gear units shown in Figure 1 could be replaced epicyclic units in which the input is the sun gear, the output is the gear carrier and the reaction member, equivalent to the gear carrier in Figure 1, is the internal gear. Furthermore, while it is preferred that the inventive concepts embodied in the transmission described in this specification be combined in one unit to give a transmission with unusual adaptability of performance to operating conditions, many of the inventive concepts contained in this transmission can be utilized separately. For example, the governor which will subsequently be described in detail could be used in conjunction with another suitable transmission. The feature of controlling the clutching of input to the reaction member of a gear reduction unit by a governor responsive to output speeds, the output speeds effective to operate the governor being modulated by the throttle of the prime mover, could be used with a transmission having only one reduction gear unit. Also the additional feature of disconnecting the clutch between the input and the reaction member of the gear reduction unit independently of the operation of the governor could be used in a transmission having only one reduction gear unit. While it is preferable to take advantage of the initial continuous variations of torque with a hydraulic coupling of the torque converter fluid coupling type, other features of the transmission could be used with a simple fluid coupling or even with the omission of any form of hydraulic coupling. Another feature which could be utilized separately is the use of torque reversal to engage the clutch between the rear gear carrier and the input and the use of the reaction of the reaction member of the torque converter to insure the disengagement of this clutch. Other inventive features which could be used separately will be apparent from the detailed description.

Figure 2:
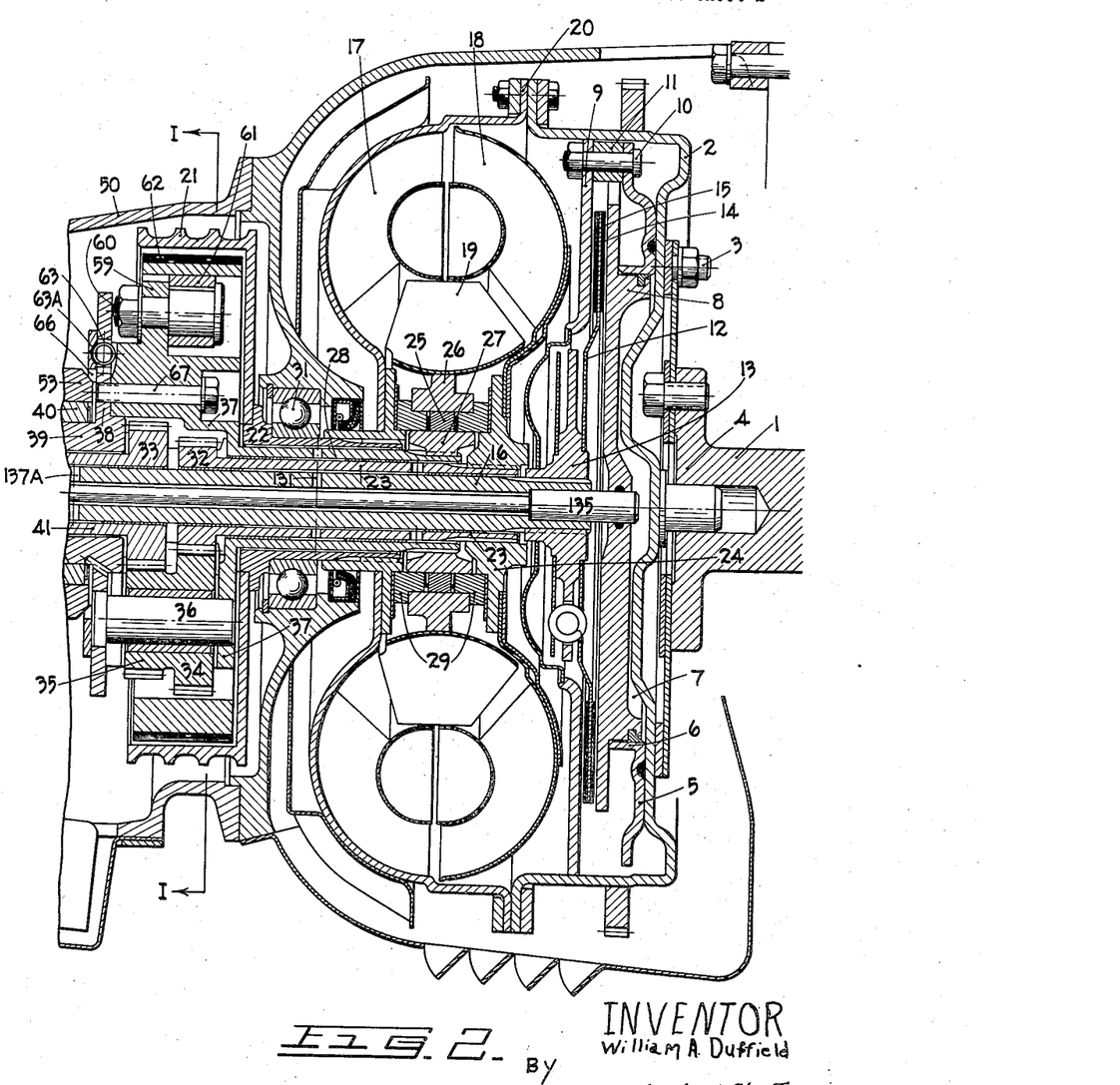
Figure 2 is a side sectional elevation view of the forward end of the transmission.
Figures 3, 14:
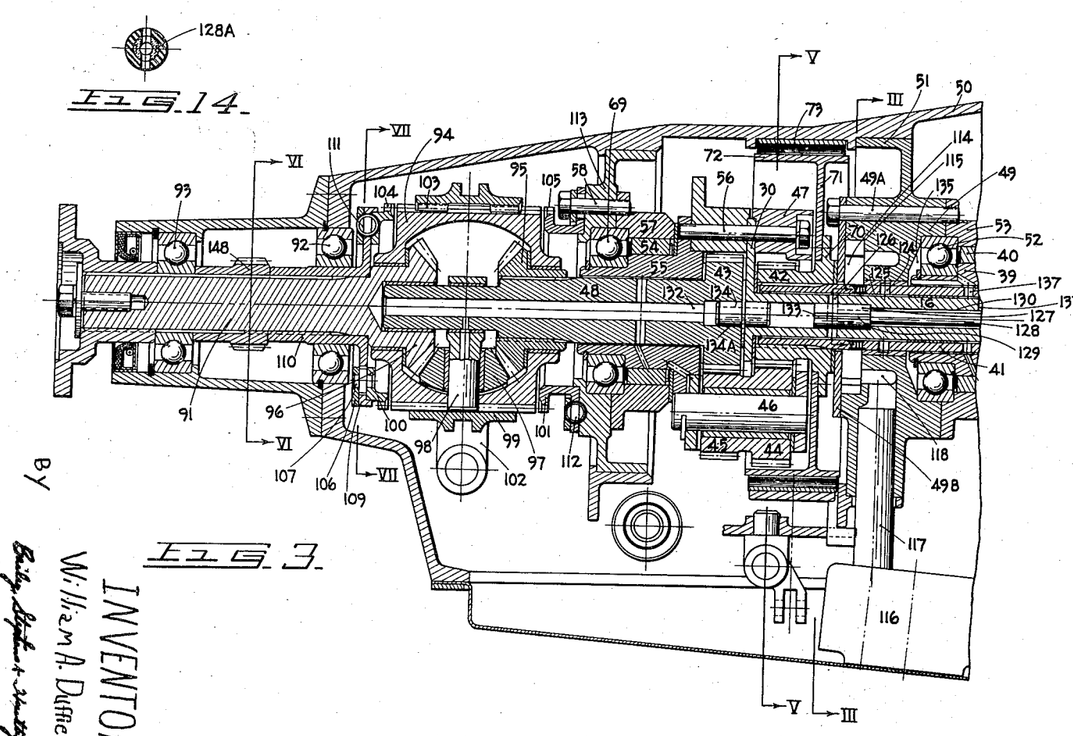
Figure 3 is a side sectional elevation view of the rear end of the transmission.
Figure 14 is a section view on the line VIII—VIII of Figure 3.

A further understanding of the operation and construction of the transmission of this invention in its preferred embodiment will be obtained from the following detailed description. Referring to Figures 2 and 3, the input power shaft 1 is bolted to the flywheel unit 2 by the bolts 3 and is centered by the pilot bearing housing 4. A flanged stamping 5 is secured to the flywheel unit 2 and is shaped as at 6 to form an annular cylinder 7 within which the clutch piston 8 can reciprocate. A pressure plate 9 is also secured to the stamping 5 by means of the bolts 10 and the spacers 11 holding the pressure plate 9 at a fixed distance from the stamping 5 to provide a working space between the piston 8 and the pressure plate 9 for the clutch disc 12.

The clutch disc 12 is mounted on the hub 13 and is provided with the friction surfaces 14 and 15, the friction surface 14 being for engagement with the piston 8 and the surface 15 being for engagement with the pressure plate 9, as the piston 8 is caused to move rearwardly in its cylinder 7 by oil pressure as hereinafter described. The hub 13 is splined to the centre shaft 16, therefore, when the piston 8 is moved rearwardly and the clutch disc 12 engages with the pressure plate 9, the shaft 16 and the flywheel unit 2 and input power shaft 1 are coupled together.

The hydraulic coupling is of the fluid torque converter fluid coupling type and is composed of three main elements, these being the impeller 17, the runner or turbine member 18 and the reaction member 19. The impeller 17 is bolted directly to the flywheel unit 2 by the bolts 20. The impeller 17 is splined to the stub shaft 22 and to this stub shaft is secured the centrifugal clutch drum 21 so that it, the impeller and the flywheel unit are coupled together with and rotate at the same speed as the input power shaft 1. The runner or turbine member 18 is mounted on the turbine shaft 23 by means of the splined hub 24. The reaction member 19 is mounted on the outer race member 26 of the over-running clutch 25, the inner race member 27 of the clutch being splined to the stub shaft 28. The whole assembly is positioned fore and aft by the combined radial and thrust bearing blocks 29.

The centre shaft 16 is journalled within the shaft 23 and is provided with a flange 30 at its rear end through which the shaft is coupled up to the rear gear carrier 47. The stub shaft 22 which carries the impeller 17 and the centrifugal clutch drum 21 is journalled between the shaft 28 and the ball bearing 31. The ball bearing 31 is therefore the main forward bearing of the transmission supporting each of the shafts 16, 23, 28 and 22.

The turbine shaft 23 is journalled on the inner shaft 16 and terminates at its rear end in the sun gear 32, which is the input gear of the first or forward gear set. This first gear set comprises the input sun gear 32, the output sun gear 33 and the integral planetary gears 34 and 35, of which there are usually three in number spaced around the sun gears. These planetary gears 34 and 36 are journalled on the stub shafts 36, the gears 34 meshing with the input sun gear 32 and the gears 35 meshing with the output sun gear 33. The stub shafts 36 are mounted in the first gear carrier 37 which is integral at its forward side with the reaction stub shaft 28 and on its rear side is bolted to the flange 38 of the inner race 39 of the one-way brake 40. The output sun gear 33 of the first gear set is integral with the shaft 41 which is journalled on the shaft 16 and transfers the drive from the output side of the first gear set to the input side of the second gear set.

The second gear set comprises the input sun gear 42, the output sun gear 43 and the integral planetary gears 44 and 45 of which there are usually three in number spaced around the sun gears. The gears 44 mesh with the input sun gear 42 while the gears 45 mesh with the output sun gear 43. The planetary gears 44 and 45 are journalled on the stub shafts 46 which are mounted in the second gear carrier 47. The output sun gear 43 is integral with the output shaft 48. The first gear set and the second gear set are therefore connected together through the gears, and the gearing is therefore in series.

Situated between the two gear carriers 37 and 47 is the oil pressure pump body 49 which is secured to the transmission casing 50 and 51 and which also provides a seat for the ball bearing 52. The bolts 49A passing through the pump block 49 secure the pump cover 49B on the rear, and the outer race 53 of the one-way brake 40 on the front of the pump block. The inner race 39 of the one-way brake 40 projects rearwardly to provide the inner seat for the ball bearing 52. The reaction forces from the first gear set are therefore taken up through the one-way brake 40, the outer race 53 and pump block 49 into the transmission casing 50. The reaction forces from the second gear set are taken up through the one-way brake 54 from its inner race 55 which is secured to the gear carrier 47 by bolts 56, and its outer race 57 which is secured to the transmission casing 50 by the bolts 58.

Figures 4, 5:
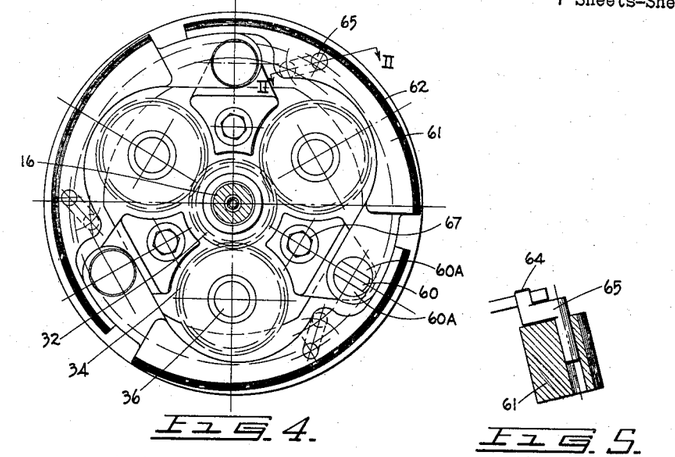
Figure 4 is a section view on the line I—I of Figure 2 showing the centrifugal clutch.
Figure 5 is a section view on the line II—II of Figure 4 showing the connecting dog leg links of the clutch.

The first gear carrier 37 is provided with a series of lugs 59 carrying the pivot bolts 60 on which are pivoted the centrifugal clutch shoes 61. These shoes 61 have friction surfaces 62 which make contact with the inner surface of the clutch drum 21 when the shoes 61 are caused to move outwardly by centrifugal force when the gear carrier 37 starts to run forward. When the centrifugal clutch shoes 61 engage the clutch drum 21 a direct coupling is effected between the gear carrier 37 and the impeller 17 of the fluid torque converter and with the input power shaft 1. The pivot bolts are flattened and are sandwiched between segmental bushings 60A. There is a slight plat at the narrow edges of the pivot bolts to facilitate the flush engagement and clean withdrawal of the friction surfaces 62 and the clutch drum 21. As mentioned previously, the orientation of the pivot bolts can be pre-set to vary the point at which the centrifugal clutch will disengage or maintain engagement.

Synchronizing means are provided whereby the clutch shoes 61 are constrained to act uniformly for engagement of the gear carrier 37 with the clutch drum 21. The synchronizing ring 63 has the apertures 64 in which are pivoted one end of each of the dog-leg links 63. (See Figure 5.) The other ends of the links engage the clutch shoes 61. The synchronizing ring 63 acts by means of the springs 63A to hold the clutch shoes 61 out of engagement with the clutch drum 21 until such time as the gear carrier 37 starts to run forward and centrifugal force, generated by the forward running of the gear carrier, overcomes the effect of the springs 63A and forces the clutch shoes 61 to swing outwardly into engagement with the drum 21. The synchronizing ring 63 is held in place against the side of the gear carrier 37 by the retainer plate 66. The bolts 67 securing the retainer plate 66 to the gear carrier 37 pass through slotted holes in the synchronizing ring, thereby allowing the ring to have a limited rotation relative to the gear carrier and the retainer plate 66. This limited rotation is sufficient to allow for the outward movement of the clutch shoes 61. The springs 63A are seated in companion slots or recesses in the gear carrier 37, synchronizing ring 63 and retainer plate 66 and are compressed when the synchronizing ring is rotated relatively to the gear carrier by the outward movement of the clutch shoes 61 pulling on the dog-leg links 65. As soon as centrifugal force on the shoes is reduced, slip occurs, the springs 63A take over and rotate the synchronizing ring 63 relatively to the gear carrier 37, thereby withdrawing the clutch shoes to their inward and disengaged position.

The rear gear carrier 47 is made in two halves secured, one on either side of the flange 30 at the rear end of the centre shaft 16, by the bolts 56. Also secured to the assembly of the rear gear carrier 47 is the hub 55 which is journalled on the output shaft 48 and forms the inner support for the rear ball bearing 69 and also forms the inner race of the one-way brake 54, the outer race 57 of which is anchored to the transmission casing 50 by the bolts 58.

Figure 8:
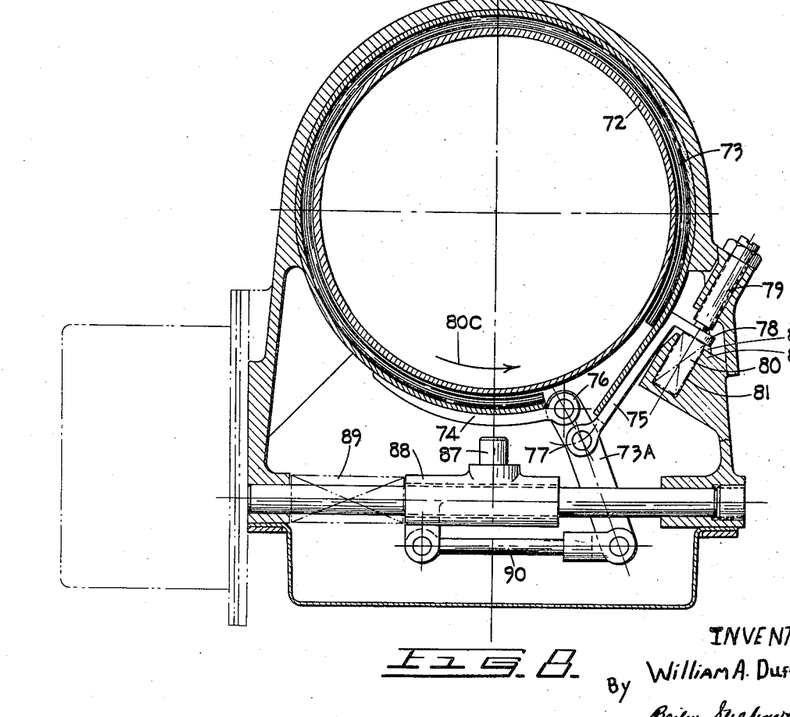
Figure 8 is a section view on the line V—V of Figure 3 showing the brake band which acts on the input sun gear of the rear gear reduction unit.
Figure 11:
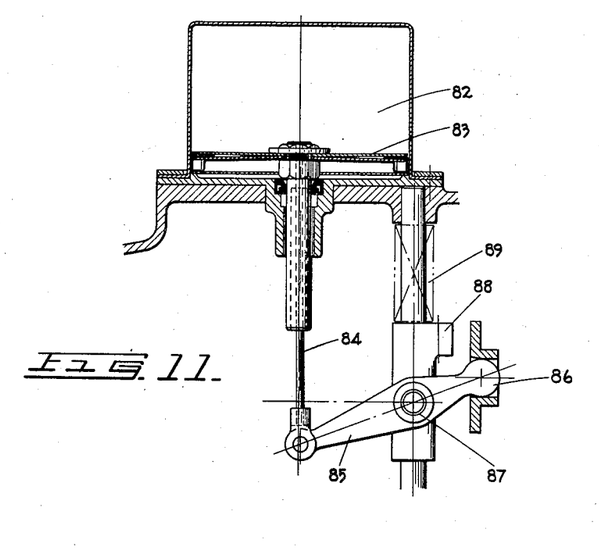
Figure 11 is a section view showing the vacuum control of the brake band in Figure 8.

An annular flange 70 integral with input sun gear provides a seat for the carrier 71 of brake drum 72. The construction and operation of this brake will be apparent from Figures 8 and 11. The brake band 73 is tightened on the brake drum 72 by means of a lever arm 73A, the clockwise biasing of which pulls connecting member 74 towards anchor plate 75. As connecting member 74 is secured at one end of the brake band and anchor plate 75 at the other end of the brake band, this will have the effect of tightening the brake band around the brake drum. The free end of connecting member 74 is pivotally secured to lever 73A at 76. One end of anchor plate 75 is pivotally connected to the lever arm 73 at 77, the other end of the anchor plate is offset to provide the foot 78. This foot 78 is urged against anchor screw 79 by the spring 80 which is set in a socket 81 in the wall of the transmission casing 50. This positions the band for initial engagement and prevents chatter when the brake band is released. Foot 78 is spaced from spring seat 80A to provide a clearance 80B. When the band is first applied, the anchor bracket lug or foot 78 is carried against the anchor screw 79 by the inertia and fluid drag on the drum 72 in the direction indicated by arrow 80C. When the inertia force is overcome the band is hard set upon the drum 72, and as the inertia load disappears the vacuum pull upon the lever 73A will revolve the band 73 and the drum 72 backwards against rotation by the amount of the clearance 80B. This backward movement is sufficient to relieve the fluid drag upon the reverse mechanism, subsequently to be described to facilitate the engagement and disengagement of the reverse mechanism. The tightening of the brake band is effected through vacuum cylinder 82 containing piston 83. Suction within the vacuum cylinder causes tension on cable 84. This acts to pivot lever 85 about stationary ball and socket joint 86. An intermediate portion of lever 85 is pivoted on pin 87. Therefore the tension on cable 84 causes crosshead 88 to move towards the vacuum cylinder and against the pressure of return spring 89. Link 90 connects the crosshead with the end of lever arm 73A. Accordingly tension on cable 84 causes tightening of the brake band in the manner which has been described. This brake band is applied momentarily to halt the rotation of input sun gear 42 of the rear gear carrier so as to ease changes in the reverse gearing.

The output sun gear 43 of the rear gear set is integral with output shaft 48, which is journalled within hub 55 and is thus supported by bearing 69. Output shaft 48 enters the reverse gear mechanism, the output of which drives tail shaft 91. The tail shaft is supported in bearings 92 and 93.

Figures 9, 10, 13:
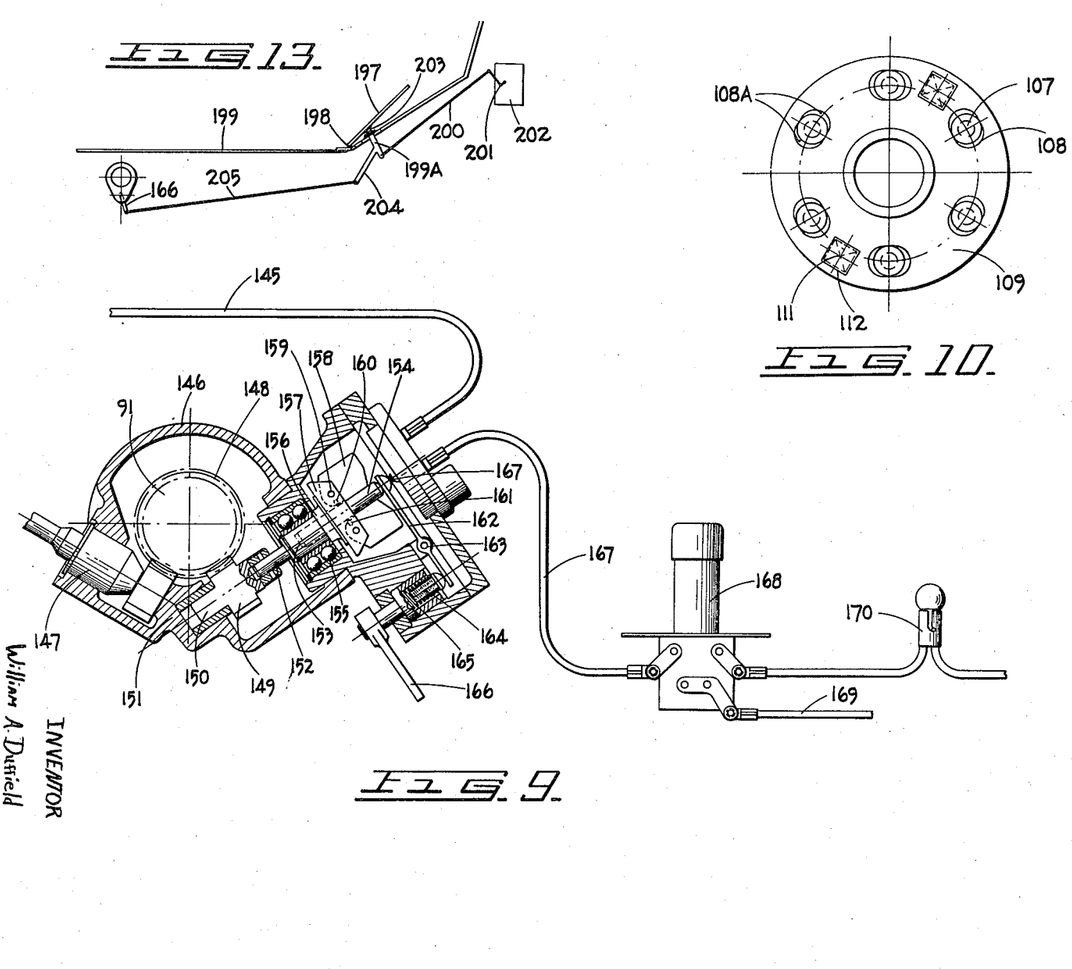
Figure 9 is a section view on the line VI—VI of Figure 3 showing one form of governor and also showing the control switch and signal lamp.
Figure 10 is a section view on the line VII—VII of Figure 3.
Figure 13 is a section view showing the connection of the throttle to the governor.

The reverse gear mechanism comprises a gear carrier 94 containing input bevel gear 95, which is splined to shaft 48 and output bevel gear 96 integral with shaft 91. These bevel gears mesh with each of bevel gears 97, which are mounted in gear carrier 94 on pins 98. The axes of pins 98 are perpendicular to the axes of shafts 48 and 91. It will be apparent that when gear carrier 94 is stationary, bevel gears 97 will cause output bevel gear 96 to rotate in a direction opposite to that of input bevel gear 95, whereas if gear carrier 94 rotates with shaft 91 or shaft 48 the reverse gearing will be locked and shafts 48 and 91 will rotate in the same direction. The change between the gear carrier being stationary and rotating with the output shafts is achieved by sliding collar 99 rearwardly for engagement with clutch ring 100 for forward drive, and forwardly for engagement with brake ring 101 for reverse drive by means of control lever 102. Collar 99 is splined to gear carrier 94 to permit forward and rearward movement. The splines 103 on the collar engage corresponding teeth 104 and 105 in the rear and forward rings respectively. The rear clutch ring 100 is mounted on backing ring 106 by spacer rivets 107 which pass through the flange 109 of boss 110 and thence through slotted holes 108 in clutch ring 100. The rivets are centered in the slotted holes 108 by springs 111 in spring seats 112. These spring seats consist of adjacent slots in the clutch ring 100, flange 109 and backing ring 106. Thus the clutch ring 100 can move clockwise or counter-clockwise by the amounts indicated at 108A. This facilitates ease of engagement between teeth 104 and splines 103, regardless of the position of carrier 94. Boss 110 is splined to shaft 91 so that when splines 103 are engaged with teeth 104 the gear carrier will rotate with shaft 91 and the reverse gearing will therefore be locked. Similarly, limited rotational movement against the influence of springs 112 is permitted between brake ring 101 and flange 113 which is secured to the static casing of the transmission. When splines 103 engage teeth 105 in brake ring 101, gear carrier 94 will be held stationary and the bevel gears will operate to effect a reversal of the direction of rotation of output shaft 91.

Figure 6:
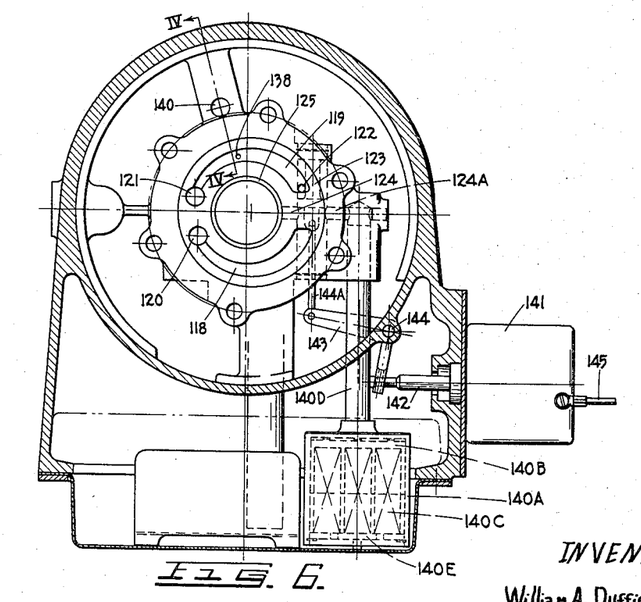
Figure 6 is a section view on the line III—III of Figure 3 showing the fluid pump assembly.
Figure 7:
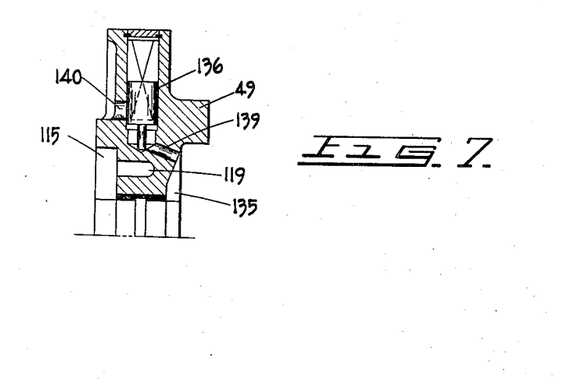
Figure 7 is a section view on the line IV—IV of Figure 6 showing the relief valve in the oil pump assembly.

The oil pump assembly which supplies fluid to operate clutch piston 8 and for lubricating purposes is shown in Figures 3 and 6. Oil pump 114 which is secured to shaft 41 rotates in rotor chamber 115, which is hollowed out of pump block 49 and sealed by pump cover 49B, and acts to lift oil from oil sump 116 through pick up pipe 117. The oil enters by intake port 118 and is transferred to delivery port 119 by oil pump 114. The intake and delivery ports are arc shaped as shown in Figure 6. At one end of each of these ports are holes 120 and 121, communicating with a spring held relief valve (not shown) which releases oil under excess pressure in the delivery port back into the intake port. At the other end of delivery port 119 there is a passage 122 communicating with the interior of a balanced piston 123. In one position of piston 123, shown in Figure 6, no oil will pass through passage 122. In a lowered position of this piston the interior of the piston will provide a path for the oil to pass into radial passage 124. From thence the oil will pass along oil gallery 125 between shafts 16 and 41 and through oil passages 126 in shaft 16 and then through drilled passages in collar 127 into the central bore 129 of transfer tube 128 which is fitted within shaft 16 to leave a clearance for oil gallery 130. Collar 127 includes longitudinal grooves 128A which do not communicate with bore 129 but which are for the transfer of lubricating oil. Low pressure lubricating oil is taken off from the high pressure system by restricted aperture 138 which communicates between delivery port 119 and space 135. Figure 7 shows relief valve 136 for excess oil pressure within space 135. Lubricating oil will pass through passages 137 and 137A into oil gallery 130 from whence lubricating oil will be supplied to the various bearings and other moving parts of the transmission through various radial passages such as 131. The rear end of the transmission will be lubricated through grooves 128A, and the bore 134 in collar 134A, which pass oil from oil gallery 130 into oil passage 132 from whence the oil similarly lubricates moving parts of the rear portion of the transmission.

When piston 123 is positioned to permit oil to be supplied under pressure into the bore 129 of tube 128, the oil will travel forward and will be fed through collar 135, which provides the forward support for tube 128 into clutch cylinder 7. The pressure of the oil will act to move piston 8 rearwardly causing the clutching engagement of friction surfaces 14 and 15 with piston 8 and pressure plate 9.

A modulator is provided for the hydraulically operating clutch. When control valve 123 is moved from the off position shown in Figure 6 to a lowered position to permit oil to pass into radial passage 124, oil pressure will also be exerted in passage 124A leading to the modulator. Passage 124A is an outward extension of passage 124. The modulator consists of a cylinder 140A containing a piston 140B acting against compression springs 140C and being connected to passage 124A by connecting pipe 140D. When oil is admitted to channel 124 it will at the same time pass through passage 124A and pipe 140D to the interior of cylinder 140A where it will depress piston 140B against the influence of compression springs 140C. The initial pressure in clutch cylinder 7 will be equal to the pressure required to initiate depression of piston 140B. As springs 140C are compressed their resistance to compression will progressively increase until the movement of piston 140B is stopped by abutment between the piston and retaining plate 140E. The oil pressure in clutch cylinder 7 will progressively rise in a corresponding manner. The modulator will thus give a pressure gradient which will provide smooth engagement for the hydraulically operated clutch. The modulator will only act during engagement of the clutch. When piston 123 is moved upwardly to disengage the clutch, oil under pressure will spill out both from passage 124 and 124A, and there will be an immediate drag free disengagement.

Piston 123 is reciprocated to control the admission of oil to cylinder 7 by means of governor controlled solenoid 141. When the governor closes an electrical circuit to energize the solenoid, pin 142 travels inwardly towards the solenoid to rotate bell crank lever 143 about pivot pin 144. Lever 143 is connected to piston 123 through link 144A. Thus piston 123 is lowered to permit the passage of oil into transfer tube 128, and thus the clutch is engaged. One branch of the solenoid is grounded on the transmission casing. Line 145 connects the other branch to the governor.

One form of governor is shown in Figure 9. It includes a housing 146, encircling tail shaft 91, which contains the speed and mileage indicating takeoff 147 and the governor mechanism. The governor drive gear 148 is splined to tail shaft 91 and drives pinion 149, which has an axial extension 150 journalled in bearing block 151. Pinion 149 is coupled to shaft 152 which has a widened portion 153 bored telescopically to receive shaft 154. Portion 153 is supported in ball bearings 155 and has an annular collar 156 which supports weight carrier 157. Weights 158 are pivotally supported by pins 159 in the carrier 157 and include slots 160 located interiorly of pins 159. Slots 160 are adapted to receive yoke 161 which extends laterally from shaft 154. It will be apparent that outward biasing of weights 158 will cause shaft 154 to move away from shaft 152. Shaft 154 bears against contact lever 162 which is pivoted at 163. The other end of lever 162 bears against pin 164. Compression spring 165 urges pin 164 towards lever 162. Thus the position of lever 162 depends upon the relative amounts of the opposing moments about pivot point 163 exerted by compression spring 164 and by the tendency of governor weights 158 to bias outwardly under the influence of centrifugal force. Control lever 166 acts to change the compression of spring 165 and thus modifies the force which it exerts. Control lever 166 is connected with the throttle of the prime mover in such a manner that with a light throttle the compression of and therefore the force exerted by spring 165 will be reduced and lever 162 will pivot clockwise at a reduced speed of rotation of output shaft 91 in comparison with the speed required with full throttle and high compression of spring 165. Clockwise rotation of lever 162 results in its abutting an electrical contact 167, thereby closing an electrical circuit between lines 167 and 145.

Manual control switch 168 is included in the circuit between the battery line 169 and the governor and, as has previously been explained, enables the circuit to be opened manually even when the governor calls for a closed circuit. A signal light 170 in a ground line from switch 168 is brought into circuit when the switch 168 is open to indicate the position of the switch. If switch 168 is closed and the conditions of speed and throttle are such that the governor closes the electrical circuit between lines 145 and 167, solenoid 141 will be energized with consequent engagement of the hydraulically operated clutch.

Figure 12:
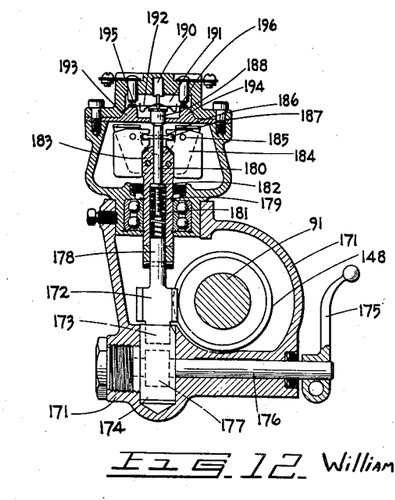
Figure 12 is a section view showing another form of governor different from that shown in Figure 9.

A modified form of governor is shown in Figure 12 in which governor housing 171 encloses the governor assembly and tail shaft 91. Shaft 91 drives a pinion 172 which is slidably coupled to drive gear 148 so as to permit axial movement of the pinion. Pinion 172 has an axial extension 173 which is journalled in bearing block 174. Control lever 175 rotates shaft 176 to move block 174 axially by means of rack and pinion 177 and thus adjust the position of pinion 172 relative to shaft 91.

Pinion 172 is integral with governor drive shaft input section 178, the end of which is bored at 179 telescopically to receive governor drive shaft output section 180. A compression spring 181 is housed within the bore of shaft 178 and acts on a collar 182 on shaft 180 tending to force shaft 180 in a direction away from shaft 178.

A governor weight carrier 183 is mounted on shaft 180 and pivotally supports governor weights 184 through pins 185. Each of the governor weights has a slot 186 located interiorly of pivot pin 185 and engaging yoke arms 187 which extend laterally from shaft 180.

It will be apparent that the outward biasing of governor weights 184 with an increase in centrifugal force will tend to move shaft 180 in a direction towards shaft 173 against the compression of spring 181. Control lever 175 will change the compression of spring 181 and will therefore adjust the speed at which the governor weights will overcome the force exerted by spring 181.

When the governor weights 184 bias outwardly shaft 180 will travel in a direction away from shaft 178 and will depress pin 188, acting against the influence of spring 190. Depression of pin 188 actuates a reversible snap switch 191 to cause contact bar 192 to be moved from its position on shoulders 193 and 194 to a position in which it bridges terminals 195 and 196, thus closing an electrical circuit as required.

Preferably control lever 175 is synchronized with the throttle as described in connection with the governor shown in Figure 9. However, other methods of control and applications are available for the governor shown both in Figures 9 and 12.

In Figure 13 one way of connecting the throttle to the control lever of the governor is illustrated. An accelerator pedal 197 is pivotally mounted at hinge 198 on floor plate 199. The stem 199A of the accelerator is connected to rod 200 which is part of a standard linkage to operate the throttle 201 in the carburetor 202. For convenience of illustration the position and scale of the carburetor have been altered and the linkage simplified as these components are of standard construction. A return spring 203 is provided for accelerator pedal 197. An extension arm 204 is welded to or made integral with stem 199A and this arm is linked by connecting rod 205 to the control lever 166 of the governor. It will be apparent that the arrangement described will result in the governor control being synchronized with the throttle position.

It will be apparent from the foregoing that a transmission in accordance with this specification combines a number of inventive features to provide a transmission which will show excellent performance under a wide variety of practical conditions.

I claim:

1. A variable speed transmission comprising a hydraulic coupling of the converter fluid coupling type and including an input shaft, an impeller driven by the input shaft, a runner and a converter reaction member, a first reduction gear unit comprising an input member, an output member and a first reaction member, said input member acting to drive said output member against the reaction of said first reaction member, a driving connection between said runner and said input member, a second reduction gear unit comprising an input member, an output member and a second reaction member, the input member of the second reduction gear unit acting to drive the output member of the second gear unit against the reaction of the second reaction member, a driving connection between the output member of the first gear unit and the input member of the second gear unit, an output shaft drivably connected with the output member of said second gear unit, a driving connection between the converter reaction member and said first reaction member, said driving connections including a one way break to permit forward rotation of the reaction member while transmitting the reaction of the converter reaction member to said first reaction member, a centrifugal clutch between the input shaft and said first reaction member, said clutch being engaged under predetermined conditions of speed and torque by forward rotation of said first reaction member and said clutch disengaging under predetermined conditions of speed and torque, a second clutch connecting said second reaction member with the input shaft, means to control the engagement and disengagement of the second clutch comprising a governor responsive to the speed of rotation of said output shaft acting to engage said second clutch to provide a stage intermediate between a stage at which the converter reaction member runs forward and direct drive, said second clutch being in engagement during direct drive, and means to disengage said second clutch independently of said governor.

2. A variable speed transmission comprising a hydraulic coupling of the converter-fluid coupling type and including an input shaft, an impeller driven by the input shaft, a runner and a converter reaction member, a first reduction gear unit comprising an input member, an output member and a first reaction member, said input member acting to drive said output member against the reaction of said first reaction member, a driving connection between said runner and said input member, a second reduction gear unit comprising an input member, an output member and a second reaction member, the input member of the second reduction gear unit acting to drive the output member of the second reduction gear unit against the reaction of the second reaction member, a driving connection between the output member of the first gear unit and the input member of the second gear unit, an output shaft drivably connected with the output member of said second gear unit, a driving connection between the converter reaction member and said first reaction member, said driving connections including a one way break to permit forward rotation of the reaction member while transmitting the reaction of the converter reaction member to said first reaction member, a centrifugal clutch between the input shaft and said first reaction member, said clutch being engaged under predetermined conditions of speed and torque by forward rotation of said first reaction member and said clutch disengaging under predetermined conditions of speed and torque, a second clutch connecting said second reaction member with the input shaft, means to control the engagement and disengagement of said second clutch comprising a governor responsive to the speed of rotation of said output shaft acting to engage said second clutch to provide a stage intermediate between a stage at which the converter reaction member runs forward and direct drive, said second clutch being in engagement during direct drive.

3. A variable speed transmission as in claim 2 in which the reaction of the converter reaction member is transmitted to said first reaction member and in which the reaction of the converter reaction member combines with the reaction of said first reaction member to disengage the centrifugal clutch under conditions where said centrifugal clutch has not been disengaged prior to the occurrence of fluid torque conversion.

4. A variable speed transmission as in claim 2 in which the governor is responsive to the speed of the output shaft.

5. A variable speed transmission comprising a hydraulic coupling of the converter-fluid coupling type and including an input shaft, an impeller driven by the input shaft, a runner and a converter reaction member, a first reduction gear unit comprising an input member, an output member and a first reaction member, said input member acting to drive said output member against the reaction of said first reaction member, a driving connection between said runner and said input member, a second reduction gear unit comprising an input member, an output member and a second reaction member, the input member of the second reduction gear unit acting to drive the output member of the second reduction gear unit against the reaction of the second reaction member, a driving connection between the output member of the first gear unit and the input member of the second gear unit, an output shaft drivably connected with the output member of said second gear unit, a driving connection between the converter reaction member and said first reaction member, said driving connections including a one way break to permit forward rotation of the reaction member while transmitting the reaction of the converter reaction member to said first reaction member, a centrifugal clutch between the input shaft and said first reaction member, said clutch being engaged by forward rotation of said first reaction member under predetermined conditions of speed and torque, and said clutch disengaging under predetermined conditions of speed and torque, a second clutch connecting said second reaction member with the input shaft, and independent means to control said second clutch.

6. A variable speed transmission comprising a hydraulic coupling of the converter-fluid coupling type and including an input shaft, an impeller driven by the input shaft, a runner and a reaction member, a first all spur type planetary reduction gear unit comprising a first carrier, an input sun gear, an output sun gear and interconnected planetary gears meshing with said input and output sun gears and being mounted in said carrier, a driving connection between said runner and said input sun gear, a second all spur type planetary reduction gear unit comprising a second carrier, an input sun gear and an output sun gear and interconnected planetary gears meshing with the input and output sun gears of said second unit and being mounted in said second carrier, a driving connection between the output sun gear of said first gear unit and the input sun gear of said second gear unit, an output shaft drivably connected with the output sun gear of said second gear unit, a centrifugal clutch between the input shaft and the first carrier, means connecting the reaction member with the first carrier and including an over-running clutch to permit forward rotation of the reaction member and to transmit the reaction of the reaction member to the first carrier, said centrifugal clutch being engaged by forward rotation of the first gear carrier under predetermined conditions of speed and torque and said clutch disengaging under predetermined conditions of speed and torque, the reaction of said reaction member providing an auxiliary means tending to disengage said clutch, a second clutch connecting the second carrier with the input shaft, means to control the engagement and disengagement of the second clutch comprising a governor responsive to the speed of rotation of said output shaft acting to engage said second clutch to provide an intermediate stage between a stage at which the converter reaction member runs forward, and direct drive, said second clutch being in engagement during direct drive, means to disengage said second clutch independently of said governor.

7. A variable speed transmission comprising a hydraulic coupling of the converter-fluid coupling type and including an input shaft, an impeller driven by the input shaft, a runner and a reaction member, a first all spur type planetary reduction gear unit comprising a first carrier, an input sun gear, an output sun gear and interconnected planetary gears meshing with said input and output sun gears and being mounted in said carrier, a driving connection between said runner and said input sun gear, a second all spur type planetary reduction gear unit comprising a second carrier, an input sun gear and an output sun gear and interconnected planetary gears meshing with the input and output sun gears of said second unit and being mounted in said second carrier, a driving connection between the output sun gear of said first gear unit and the input sun gear of said second gear unit, an output shaft drivably connected with the output sun gear of said second gear unit, a centrifugal clutch between the input shaft and the first carrier, means connecting the reaction member with the first carrier and including an over-running clutch to permit forward rotation of the reaction member and to transmit the reaction of the reaction member to the first carrier, said centrifugal clutch being engaged under predetermined conditions of speed and torque by forward rotation of the first gear carrier and said clutch disengaging under predetermined conditions of speed and torque, said reaction member providing an auxiliary means tending to disengage said clutch, a second clutch connecting the second carrier with the input shaft, means to control said second clutch comprising a governor responsive to the speed of rotation of said output shaft acting to engage said second clutch to provide a stage intermediate between a stage at which the converter reaction member runs forward and direct drive, said second clutch being in engagement during direct drive.

8. A variable speed transmission comprising a hydraulic coupling of the converter-fluid coupling type and including an input shaft, an impeller driven by the input shaft, a runner and a reaction member, a first all spur type planetary reduction gear unit comprising a first carrier, an input sun gear, an output sun gear and interconnected planetary gears meshing with said input and output sun gears and being mounted in said carrier, a driving connection between said runner and said input sun gear, a second all spur type planetary reduction gear unit comprising a second carrier, an input sun gear and an output sun gear and interconnected planetary gears meshing with the input and output sun gears of said second unit and being mounted in said second carrier, a driving connection between the output sun gear of said first gear unit and the input sun gear of said second gear unit, an output shaft drivably connected with the output sun gear of said second gear unit, a centrifugal clutch between the input shaft and the first carrier, means connecting the reaction member with the first carrier and including an over-running clutch to permit forward rotation of the reaction member and to transmit the reaction of the reaction member to the first carrier, said centrifugal clutch being engaged under predetermined conditions of speed and torque by forward rotation of the first gear carrier and said clutch disengaging under predetermined conditions of speed and torque, the reaction of said reaction member providing an auxiliary means tending to disengage said clutch, a second clutch connecting the second carrier with the input shaft, and independent means to control said second clutch.

9. A variable speed transmission comprising a hydraulic coupling including an input shaft, an impeller driven by the input shaft and a runner, a first reduction gear unit comprising an input member, an output member and a first reaction member, said input member acting to drive said output member against the reaction of said first reaction member, said input member being driven by the runner of the fluid coupling, a second reduction gear unit comprising an input member, an output member and a second reaction member, the input member of the second reduction gear unit acting to drive the output member of the second reduction gear unit against the reaction of the second reaction member, the input member of the second reduction gear unit being driven by the output member of the first reduction gear unit, a first clutch means for coupling the input shaft to the first reaction member, means for controlling the action of said first clutch means, a second clutch means for coupling the input shaft to the second reaction member, means for controlling the action of the second clutch means independently of the operation of the first clutch means, whereby both first and second clutch means are engaged during direct drive, the first clutch only is engaged during one stage of operation with torque conversion occurring only in the second reduction gear unit and the second clutch only is engaged during another stage of operation in which the input member of the second reduction gear unit is driven at a slower speed than the second reaction member to provide torque conversion between the input shaft and the output member of the second reduction gear.

10. A variable speed transmission as in claim 9 in which the hydraulic coupling is of the torque converter-fluid coupling type and includes a reaction member which runs forward when fluid torque conversion ceases.

11. A variable speed transmission as in claim 10 in which forward rotation of said first reaction member acts to engage said first clutch and in which the reaction of the reaction member of the fluid torque converter tends to disengage said first clutch where the conditions are such that said first clutch is engaged at the initiation of fluid torque conversion during changing down.

12. A variable speed transmission as in claim 11 in which the means for controlling the second clutch means comprises a governor automatically responsive to predetermined speed conditions intermediate between the stage at which the reaction member of the fluid torque converter runs forward and the direct drive stage.

13. A variable speed transmission as in claim 12 in which the means for controlling the second clutch means includes means to disengage the second clutch means independently of the operation of said governor.

14. A variable speed transmission comprising a hydraulic coupling of the converter-fluid coupling type and including an input shaft, an impeller driven by the input shaft which conducts power from a prime mover, a runner and a converter reaction member, a first reduction gear unit comprising an input member, an output member and a first reaction member, said input member acting to drive said output member against the reaction of said first reaction member, a driving connection between said runner and said input member, a second reduction gear unit comprising an input member, and output member and a second reaction member, the input member of the second reduction gear unit acting to drive the output member of the second reduction gear unit against the reaction of the second reaction member, a driving connection between the output member of the first gear unit and the input member of the second gear unit, an output shaft drivably connected with the output member of said second gear unit, a driving connection between the converter reaction member and said first reaction member, said driving connections including a one way break to permit forward rotation of the reaction member while transmitting the reaction of the converter reaction member to said first reaction member, a centrifugal clutch between the input shaft and said first reaction member, said clutch being engaged under predetermined conditions of speed and torque by forward rotation of said first reaction member, and said clutch disengaging under predetermined conditions of speed and torque, a second clutch connecting said second reaction member with the input shaft, means to control said second clutch comprising a governor responsive to the speed of rotation of said output shaft acting to engage said second clutch to provide a stage intermediate between a stage at which the reaction member runs forward and direct drive, said second clutch being in engagement during direct drive, means to control said governor in accordance with the degree of throttling of said prime mover so that at light throttle the governor operates at a predetermined output speed and at full throttle the governor operates at a speed higher than said predetermined output speed.

15. A transmission as in claim 14 in which said centrifugal clutch and governor are adjusted such that on changing down at light throttle the centrifugal clutch will disengage prior to the operation of said governor, and on changing down a full throttle the governor will operate to disengage said second clutch prior to the disengagement of the centrifugal clutch.

16. A transmission as in claim 15 in which the means to control said second clutch includes means to disengage the second clutch independently of the operation of the governor.

17. A variable speed transmission comprising a hydraulic coupling including an impeller driven by a prime mover through an input shaft and a runner, a gear reduction unit comprising an input member, an output member and a reaction member, said input member acting to drive said output member against the reaction of said reaction member, means for clutching said reaction member to the input shaft, means to control said clutching means, a driving connection between the runner and said input member including a second gear reduction unit operative under predetermined conditions of speed and torque and a direct drive connection operative under other predetermined conditions of speed and torque, said means to control the clutching means including means operating at an output speed which is higher with increased throttling of the prime mover.

18. A variable speed transmission as in claim 17 in which the means to control the clutching includes additional means to disengage the clutching means independently of the action of said means operating at an output speed which is higher with increased throttling of the prime mover.

19. In a multi-stage variable speed transmission having an output side, the combination of a hydraulic coupling of the converter-fluid coupling type, a pair of planetary gear units, each including input and output sides and comprising a carrier, a governor driven from the output side of the transmission, a hydraulically operated clutch controlled by said governor, a centrifugal clutch, a drive connection between the output side of the fluid torque converter and the input side of the first of said planetary gear units, a drive connection between the output side of the first of said planetary gear units and the input side of the second of said planetary gear units, and an output drive shaft from the output side of the second of said planetary gear units, both of said clutches being disengaged during first and second stage operation and fluid torque conversion occurring between the first and second stage, said hydraulically operated clutch, when energized by control action of said governor, forming a coupling between the carrier of the second planetary gear unit and the input side of the fluid torque converter for third stage drive and said centrifugal clutch, when energized by a reversal of torque in the transmission, forming a coupling between the carrier of the first planetary gear unit and the input side of the fluid torque converter for direct drive, said hydraulically operated clutch being in engagement during direct drive.

20. In a variable speed transmission, two gear reduction units, each comprising an input member, an output member and a reaction member, said input member acting to drive said output member against the reaction of said reaction member, the output member of the first of said units being drivably connected to the input member of the second of said units, means for transmitting input to the input member of the first of said units for one reduction ratio, both gear reduction units acting in series during said one reduction ratio, means for transmitting input both to the input member of the first of said units and to the reaction member of the second of said units for another reduction ratio, the reaction from the second of said units passing through the input member to the second of said units and being absorbed by the reaction member of the first of said units during said another reduction ratio, means for transmitting input both to the input member of said first unit and to the reaction member of said first unit for an additional reduction ratio, the output of said first unit passing to the input member of said second units and the reaction member of said second unit acting as a reaction member during said additional reduction ratio, and means for transmitting input to both the input member and the reaction member of said first unit and to the reaction member of the second unit for direct drive, the output of said first unit being transmitted to the input member of said second unit during direct drive.

References Cited in the file of this patent

UNITED STATES PATENTS

| | | |
|---|---|---|
| 2,218,760 | McNeil et al. | Oct. 22, 1940 |
| 2,222,507 | Hunt | Nov. 19, 1940 |

(Other references on following page)

UNITED STATES PATENTS

| | | |
|---|---|---|
| 2,352,212 | Lang et al. | June 27, 1944 |
| 2,372,817 | Dodge | Apr. 3, 1945 |
| 2,449,586 | Carnagua | Sept. 21, 1948 |
| 2,531,611 | Canfield | Nov. 28, 1950 |
| 2,536,861 | Weeks | Jan. 2, 1951 |
| 2,549,090 | Hobbs | Apr. 7, 1951 |
| 2,588,220 | Duffield | Mar. 4, 1952 |
| 2,595,969 | McFarland | May 6, 1952 |
| 2,616,310 | Jandasek | Nov. 4, 1952 |
| 2,640,373 | Jandasek | June 2, 1953 |
| 2,645,137 | Roche | July 14, 1953 |
| 2,648,533 | Maxwell | Aug. 11, 1953 |
| 2,667,085 | Ackerman | Jan. 26, 1954 |
| 2,679,169 | Duffield | May 25, 1954 |
| 2,707,887 | Slack | May 10, 1955 |
| 2,722,296 | Stoeckicht | Nov. 1, 1955 |
| 2,791,913 | Slack | May 14, 1957 |

FOREIGN PATENTS

| | | |
|---|---|---|
| 405,453 | Great Britain | Feb. 8, 1934 |